United States Patent

[11] 3,576,126

| [72] | Inventor | Frederick G. Weighart |
| | | Sunset Cove, Brookfield, Conn. |
| [21] | Appl. No. | 829,696 |
| [22] | Filed | June 2, 1969 |
| [45] | Patented | Apr. 27, 1971 |
| [73] | Assignee | Automation Industries, Inc. |
| | | Century City, Calif. |
| | | Continuation of application Ser. No. 523,816, Dec. 13, 1965, now abandoned. |

[54] ULTRASONIC BOND TESTER
13 Claims, 3 Drawing Figs.

[52] U.S. Cl. .................................................. 73/67.7, 73/67.9
[51] Int. Cl. .................................................. G01n 9/24
[50] Field of Search .................................... 73/67.5—67.9

[56] References Cited
UNITED STATES PATENTS
3,090,224   5/1963   Rankin ........................ 73/67.9

OTHER REFERENCES
McMaster, R. C., Nondestructive Testing Handbook, Vol. 2 sec. 45, p. 21, the Ronald Press Co., 1959

*Primary Examiner*—Richard C. Queisser
*Assistant Examiner*—John P. Beauchamp
*Attorney*—Dan R. Sadler ABSTRACT: An ultrasonic bond tester wherein a transmitting ultrasonic transducer is pulsed to launch an ultrasonic wavetrain into a bonded workpiece. The wavetrain reflected by a void is shifted in phase 180° from the wavetrain reflected by a good bond. The phase shift is detected by passing the signal from a receiving transducer to positive and negative gates, passing only positive and negative portions of the received signal respectively. The negative signal sets a one-shot multivibrator, which in turn closes a gate. Positive signals pass through the gate only if they have been shifted in phase due to reflection from a void. An alarm is operated by signals passed by the gate.

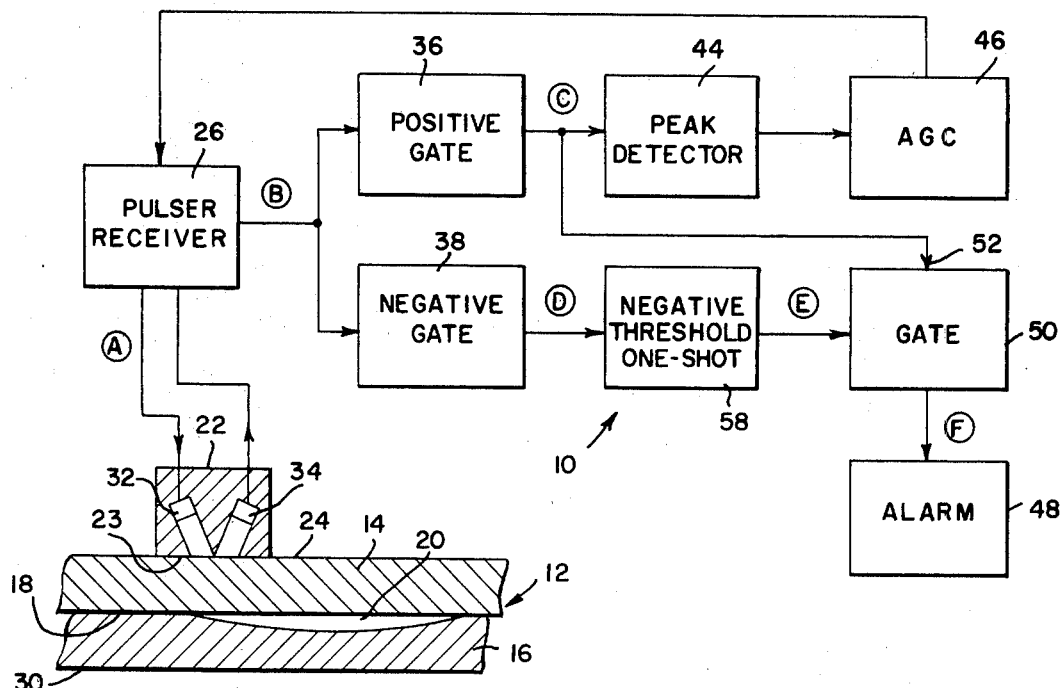
Fig. 1.
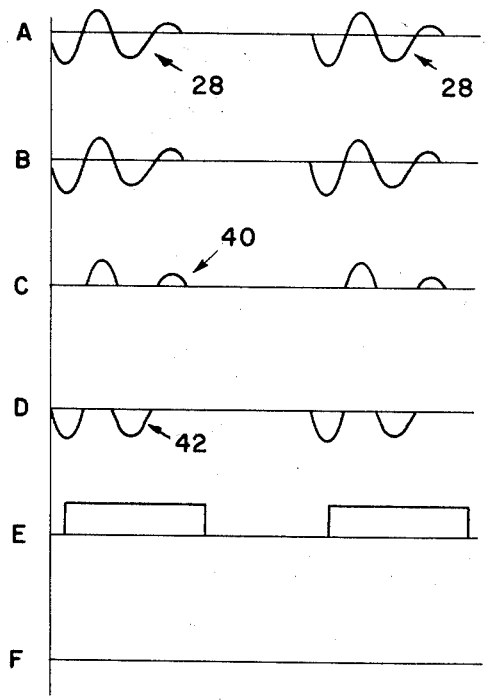
Fig. 2.
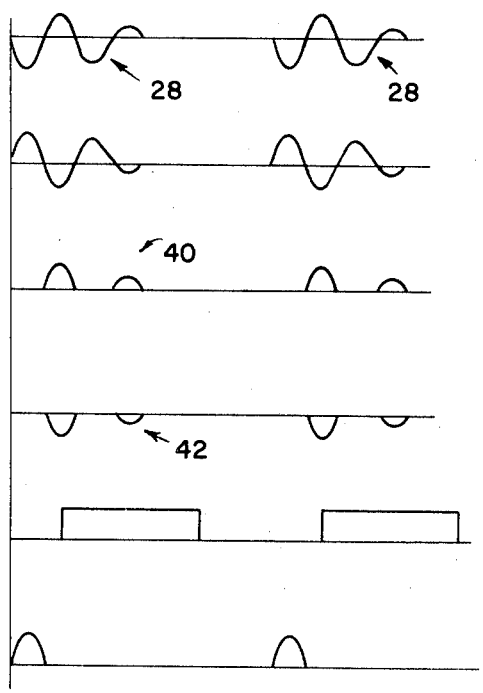
Fig. 3.
Fredrick G. Weighart,
INVENTOR.
ATTORNEY.

ULTRASONIC BOND TESTER

CROSS-REFERENCE TO RELATED APPLICATIONS

This application is a continuation of copending application Ser. No. 523,816, filed Dec. 13, 1965, by Frederick G. Weighart, and entitled "Ultrasonic Bond Tester," now abandoned.

BACKGROUND OF THE INVENTION

1. Field of the Invention

The present invention relates to nondestructive testing and more particularly, to means for ultrasonically measuring the bond between two layers of a workpiece.

2. Description of the Prior Art

At the present time it is common to employ members that are formed by bonding two materials together. For example, a plastic may be bonded onto a piece of metal. In order to obtain the maximum effectiveness of such members it is essential that the two materials be properly bonded to each other over their entire mating surfaces.

Heretofore one means of determining the effectiveness of the bond has been to transmit ultrasonic energy into one side of the member. If the two materials are properly bonded, a majority of the energy is coupled from the first material into the second material and reflected from the opposite side of the member. If there is a lack of bonding and a resultant void, very little, if any, energy will be coupled into the second material. In a pulse echo tester, the time or amplitude of the reflected echo is measured. In a through transmission tester the amount of energy passing through the member is measured.

By such techniques it has been possible, in many instances, to determine the effectiveness of the bond. However, under many other circumstances it has been very difficult, if not impossible, to determine the nature of the bond. For example, if one of the members is thin, the pulse echo tester cannot measure the differences between the echoes from the bond interface and the other reflecting surfaces of the member. If one of the surfaces of the member is not readily accessible, it is extremely difficult, if not impossible, to perform a through transmission test. In addition, in most of the prior ultrasonic testers the signals have been in such a form that some operator interpretation has been required to evaluate the bond. As a consequence in many instances it has been very difficult to reliably separate good bonds from bad bonds. It will thus be seen that the foregoing ultrasonic techniques have not been entirely suitable for all types of applications.

SUMMARY

The present invention provides an ultrasonic tester which overcomes the foregoing difficulties. This is accomplished by providing a bond tester that may be used on thick or thin structures having only one side accessible. In addition the tester provides an unambiguous signal which is of a "go" or "no-go" nature whereby no operator interpretation is required.

In the single embodiment of the invention disclosed herein a tester is provided for transmitting ultrasonic energy into the member from one side and receiving echoes of the energy reflected from the bonded interface. Means are also provided for sensing the phase shift or polarity change which occurs when the energy is reflected from the bonded interface.

DESCRIPTION OF THE DRAWINGS

These and other features and advantages of the present invention will be readily apparent from the following detailed description of a single embodiment of the present invention, particularly when taken in connection with the accompanied drawings wherein like reference numerals refer to like parts and wherein:

FIG. 1 is a block diagram of a bond tester embodying one form of the present invention;

FIG. 2 is a series of wave forms present in the tester when a bonded interface of acceptable quality is being examined; and FIG. 3 is a series of wave forms present in the tester when a bonded interface of unacceptable quality is being examined.

DESCRIPTION OF ONE PREFERRED EMBODIMENT

Referring to the drawings in more detail, the present invention is particularly adapted to be embodied in a bond tester 10 for determining the quality of an internal bond contained with a workpiece 12. This workpiece 12 includes two separate and distinct materials 14 and 16 that are bonded together at an interface 18 formed between the mating surfaces of the materials 14 and 16. If the two materials 14 and 16 are properly bonded together they will be in intimate contact across their surfaces. The interface 18 will then be free of any delaminations, voids, air pockets, etc. In the event a portion of the interface is not properly bonded, there will normally be an open space or void 20 between the two surfaces.

The two materials 14 and 16 may be of any desired variety and of any desired thickness or thinness. However, normally one of the materials will have an acoustical impedance which differs substantially from the acoustical impedance of the other material. By way of example, if one of the materials 16 is a metal it will have a relatively high acoustical impedance. However, if the other material 14 is a plastic it will have a relatively low acoustical impedance. Thus, even when the two materials 14 and 16 are properly and intimately bonded together there will be an impedance mismatch.

In the event of a lack of bonding, the resultant void is normally filled with a gas such as air. As a consequence, the impedance of the void 20 will be materially different from the impedances of either of the materials 14 and 16. Normally, it will be considerably lower than the impedances of either of the other materials 14 and 16. Accordingly, in the area of a void 20, i.e. a bond failure, the impedance mismatch will be materially different from the areas of good bond. For example, if the ultrasonic energy is propagating through the material 14 with the lowest impedance, when it reaches the interface 18 it will be reflected from the even lower impedance of the void 20 if there is a lack of bond or the higher impedance of the second material 16 if there is a satisfactory bonding.

If two materials are perfectly matched acoustically, i.e., the impedances on both sides of the interface 18 are identical to each other, very little, if any, energy will be reflected from the interface 18. However, if there is a mismatch, a large portion of the energy will be reflected from the interface 18. If the energy is initially traveling in a material having a low impedance and is reflected from a second material having a higher impedance, the energy will be reflected without a phase shift, i.e., the reflected energy will be in phase with the transmitted energy. Conversely, if the energy is initially traveling in a high impedance material and is reflected from a low impedance material, the phase of the reflected energy will be reversed, i.e., the reflected energy will be 180° out of phase with the transmitted energy.

It may thus be seen that if the energy is traveling through the first material 14 and is reflected from the interface 18 in the region of a good bond no phase shift will occur and an in-phase echo will be produced. However, if the reflection occurs at a void 20 an out-of-phase echo will be produced.

The bond tester 10 includes a transducer 22 having a face 23 that is adapted to be positioned on the exterior surface 24 of the workpiece so as to be acoustically coupled to the material 14. The transducer 22 is electrically connected to a combination pulser-receiver 26.

The pulser-receiver 26 which may be of conventional design is effective to intermittently energize the transducer 22 whereby a burst 28 of ultrasonic energy is transmitted into the workpiece. All of the bursts 28 of transmitted energy are substantially identical and are similar to the bursts in FIGS. 2A and 3A. Each burst 28 includes a series of vibrations with the initial vibration having a particular polarity such as a compression wave or a rarefaction wave. The nature of this wave is dependent upon the phase of the pulse supplied to the transducer by the pulser 26. As is well known to those skilled in the art, such pulsers conveniently operate by charging a capacitor with a given polarity and discharging it across a portion of a coil connected in parallel with the transducer.

In the present instance the bursts 28 are shown as having an initial half cycle that is negative with the amplitude of the burst 28 exponentially decaying in a very few cycles.

The transducer 22 is also adapted to receive any echoes that are reflected from within the member 12 and produce electrical signals that correspond to these echoes. The transducer 22 supplies the signals to the pulser-receiver 26 wherein they are amplified to a more useful level. The amplified signal is shown in FIGS. 2B and 3B. In addition, the receiver 26 may include gating means effective to pass only signals that occur at a time interval corresponding to echoes from the region of the interface 18. This will be effective to eliminate any signals resulting from echoes produced at the front or rear surfaces 24 or 30, etc.

The transducer 22 may be of any desired variety and may utilize a single piezoelectric crystal for transmitting the energy and receiving the echoes. However, in the present instance two separate crystals 32 and 34 are provided, one for transmitting and one for receiving. By isolating the receiving crystal 34 from the transmissions, it is easier to inspect workpieces wherein one or both of the materials 14 and 16 are very thin.

The output of the receiver 26 is coupled to a positive gate 36 and a negative gate 38. These gates 36 and 38 are substantially identical to each other, except one gate 36 passes only the positive portions of the received signal while the other gate 38 passes only the negative portions. As a consequence, the output from the positive gate 36 will include trains 40 of positive pulses similar to those in FIGS. 2C and 3C. The output from the negative gate 38 will include trains 42 of negative pulses similar to those in FIGS. 2D and 3D. It is highly desirable that the phase characteristics of these gates 36 and 38 be similar whereby the time relationships of pulses are preserved.

The output of one gate, for example the positive gate 36, is interconnected with a peak detector 44. This detector 44 is effective to sense the amplitude of the largest positive pulse in each signal, i.e., normally the first pulse and to produce a DC signal that is proportional thereto.

An automatic gain control, or AGC 46, is coupled to the output of detector 44 so as to respond to the DC signal. The AGC 46 is in turn coupled back to the receiver 26 so as to supply a control signal to the receiver 26 whereby the gain of the receiver 26 is regulated. This arrangement forms a closed loop that maintains the DC signal constant. Thus the gain of the receiver 26 will be adjusted to maintain the amplitude of the received signal (FIG. 2A or 3A) substantially constant. This is effective to eliminate variations in the coupling between the transducer 22 and the workpiece 12 and/or variations in the attenuation of the materials 14 and 16 producing misleading indications from the tester 10.

The output from the positive gate 36 is also coupled to an alarm 48 or other indicating means by a gate 50. This gate 50 is of a conventional variety having a signal input 52 and a control input 54. When there are no signals present on the control input 54, the gate 50 is open whereby the signal from the positive gate 36 will travel from the signal input 52, through the gate 50, to the output 56 and then to the alarm 48 whereby the alarm 48 will be actuated.

In contrast when a control signal is present on the control input 54, the gate 50 will be maintained closed whereby no signals will be coupled through the gate 50. Under these circumstances, even if the positive gate 36 may be supplying signals to the signal input 52, no signals will reach the alarm 50.

The output from the negative gate 38 is coupled to the control input 54 of the gate 50 by means of a one-shot multivibrator 58. This multivibrator 59 will switch its state and produce a square-wave signal such as in FIGS. 2E and 3E each time a negative pulse is supplied thereto. It has been found desirable for the multivibrator 58 to have a threshold level whereby signals below that level will not cause the multivibrator to switch.

The duration of the square wave (FIG. 2E or 3E) is some fixed amount. Normally the duration exceeds the time duration of the received signals (FIGS. 2B and 3B). As a consequence, the signals from the positive and negative gates 36 and 38 will have terminated before the square wave.

The output of the multivibrator 58 is coupled to the control input 54 of the gate 50 so as to supply the square wave thereto. It may thus be seen that the gate 50 will normally remain open. However, each time a square wave from the multivibrator 58 is applied to the control input 54, the gate 50 will close and block the passage of any signals to the alarm 48.

In order to utilize the present tester 10 for inspecting a bond between two layers of materials, the transducer 22 may be acoustically coupled to one surface 24 of the workpiece 12. Normally this will be the side containing the material 14 having the lowest acoustical impedance. The pulser 26 will then cause the first crystal 32 to intermittently transmit bursts of ultrasonic energy into the workpiece 12. This energy will propagate through the material 14 to the interface 18. Regardless of the degree of bonding, at least a portion of this energy will be reflected back to the receiving crystal 34. The crystal 34 will then produce a signal corresponding similar to that shown in FIGS. 2B or 3B.

If the bonding is of a high quality, the energy will be reflected from an interface 18 having a higher acoustical impedance on its backside. As a consequence the reflected signal will be similar to FIG. 2B and will be in phase with the transmitted signal of FIG. 2A, i.e., its initial half cycle will be negative. Accordingly, the initial half cycle of the resultant amplified signal (FIG. 2B) will be negative.

The amplified signal from the receiver 26 will be coupled through the positive and the negative gates 36 and 38 whereby a first train 40 of positive pulses (FIG. 2C) and a second train 42 of negative pulses (FIG. 2D) will be produced. It is to be noted that the pulses in the negative train 42 occur before the corresponding pulse in the positive train 40.

The first time a negative pulse exceeding the threshold level occurs, the one-shot multivibrator 58 will be switched whereby a square-wave signal is produced. This square wave is coupled to the control input 54 whereby the gate 50 is closed and the further passage of signals prevented. Subsequent to the closing of the gate 50, the first positive pulse from the positive gate 36 will reach the signal input 52. Since the gate 50 is now closed the signal will not pass through the gate 50 and the alarm 48 will not be actuated.

In the event the transducer 22 is aligned with an unbonded area, the energy will be reflected from a portion of the interface 18 having an air pocket or void 20 aligned therewith. As a consequence the backing or reflecting material will now have a lower impedance than the conducting material 14. Accordingly, the reflected energy will be shifted by 180°, i.e. its phase will be inverted from that of the transmitted energy. The received signal will now correspond to FIG. 3B and the initial half cycle will be positive.

The received signal will still be divided into trains 40 and 42 of positive and negative pulses by the positive gate 36 and negative gate 38. These trains 40 and 42 are similar to FIGS. 3C and 3D respectively. It is to be noted that the time sequence of these pulses is now reversed, i.e. the pulses in the positive train 40 occur before the pulses in the negative train 42.

When the first negative pulse reaches the multivibrator 58, a square wave is produced and applied to the control input 54. The gate 50 will then close and prevent the passage of any additional signals therethrough. However, before this occurs the initial pulse in the positive train 40 will have reached the signal input 52. This positive pulse will have been coupled through the gate 50 to the alarm 48 whereby an alarm 48 will be actuated to indicate a lack of bonding.

It may be seen that the tester 10 will provide a positive and unambiguous indication of the nature of the bonding between the two materials 14 and 16. If the bond is acceptable no alarm is produced. However, whenever the bond is unacceptable an alarm is produced. As a consequence it is not necessary for the operator to interpret the results of the inspection.

While only a single embodiment of the present invention has been disclosed herein it will be readily apparent to persons skilled in the art that numerous changes and modifications may be made thereto without departing from the spirit of the invention. For example, any suitable means may be employed for determining whether or not the reflected energy has had its phase reversed or not reversed as a result of its reflection from the interface. Also, the polarity of the received signal may be reversed, the sequence of the positive and negative trains may be reversed, etc.

Having thus described but one preferred embodiment of this invention,

I claim:

1. An ultrasonic tester for measuring the bond between a pair of mating materials having two portions of differing acoustical impedances bonded together at an interface, said tester including the combination of:

transmitting and receiving means for being acoustically coupled to the material having the lower impedance for transmitting ultrasonic energy having a first level and a second level and having a predetermined initial level through said material and for receiving returns of the ultrasonic energy from the interface and for producing an electrical signal corresponding thereto;

gating means coupled to the transmitting and receiving means and responsive to said electrical signal, said gating means being adapted to produce as separate signals a series of first level pulses corresponding to the first level electrical signal, and a series of second level pulses corresponding to the second level electrical signals; and output means operative in response to said received electrical signals coupled to the gating means for producing an output signal depending upon the time sequence of the first level and second level pulses when pulses of said second level occur first said output means being adapted to cooperate with said gating means for selecting one of said series of said separate signals.

2. The ultrasonic tester as defined in claim 1 wherein the transmitted energy is a cyclic wave of alternately changing polarity, and wherein said output means is operative in response to the polarity of the initial half cycle of the transmitted energy.

3. The ultrasonic tester as defined in claim 2 wherein the transmitted energy is a bipolar signal.

4. An ultrasonic tester for determining the bond between the interfaces of a pair of materials having different acoustic impedances, comprising:

an ultrasonic transducer means being adapted to be coupled to the material having the low impedance for transmitting ultrasonic energy into said materials, and for receiving acoustical energy for energizing said transducer and for providing an alternating polarity electrical signal upon receipt of reflected acoustic energy, said transmitted energy being a cyclic wave of alternately changing polarity and having a predetermined, fixed initial polarity;

separating means for separating portions of said alternating polarity signal, providing first and second polarity signals; and gate means being coupled to said separating means and being enabled in response to a signal of said first polarity for blocking signals of said second polarity, and for passing signals of said second polarity in the absence of a signal of said first polarity.

5. The combination as defined in claim 4 wherein said gate means includes:

a trigger circuit being coupled to said separating means and being adapted to provide an output signal in response to said first polarity signals; and a gate circuit being coupled to said trigger circuit and said separating means and being adapted to close in response to the output signal in response to the output of said trigger circuit and inhibit said second polarity signals from said separating means.

6. A nondestructive tester for measuring the bond in a workpiece having two portions of differing acoustical impedances bonded together along an interface, said tester including the combination of:

transmitting means capable of being acoustically coupled to a lower impedance portion for transmitting ultrasonic energy into said workpiece, said energy being a two-level signal of alternately changing levels and having a predetermined, fixed initial level;

receiving means for receiving the reflected energy and producing a signal corresponding thereto;

means coupled to the receiving means for providing an output signal in response to the level of said corresponding signal with respect to the predetermined fixed initial level of said transmitted ultrasonic energy, said output means including means for dividing said signals into two trains of pulses of different levels, with pulses in each of said trains corresponding to the levels and times of said received signal; and means coupled to said output means for indicating which of the two trains of pulses of different levels occurs first with relation to the predetermined fixed initial level being responsive when pulses of said second level occur first.

7. The nondestructive tester as defined in claim 6 and wherein the transmitted energy is a cyclic wave of alternately changing polarity, and wherein said output means is operative in response to the polarity of the initial half cycle of the transmitted signal.

8. The tester as defined in claim 6 wherein said indicating means includes gating means having a first state for passing the pulses of a first level and a second state for inhibiting the pulses of a first level, said gating means being responsive to the pulses of a second level in the second train to change from one of the states to the other of the states when the pulses in the first train occur before the corresponding pulses in the second train.

9. The combination as defined in claim 8 wherein said means for indicating which of the two trains of pulses of different levels occurs first includes means coupled to said gating means for providing an output signal responsive to the signals passed thereby.

10. An ultrasonic tester for measuring the bond between a pair of mating materials having two portions of differing acoustical impedances bonded together at an interface, said tester including the combination of:

transducer means, adapted to be acoustically coupled to the material having the lower impedance, for transmitting ultrasonic energy through said material, said energy having a cyclic wave of alternately changing polarity and having a predetermined, fixed initial polarity, and for receiving reflections of the ultrasonic energy from the interface of the material and producing an electrical signal corresponding thereto;

gating means coupled to the transducer means and responsive to the electrical signal for producing a series of positive pulses corresponding to the positive portions of the electrical signal, and for producing a series of negative pulses corresponding to the negative portions of the electrical signal; and output means coupled to the gating means for producing an output signal dependent upon the time sequence of the positive and negative pulses, said output means including a gate responsive to a pulse of a second polarity, said gate being effective to pass a pulse of a first polarity when pulses of said second polarity occur first.

11. A nondestructive tester for measuring the bond in a workpiece having two portions of differing acoustical impedances bonded together along the interface, said tester including:

transmitting means capable of being acoustically coupled to the lower impedance portion for transmitting ultrasonic energy into said workpiece, said energy being a cyclic wave of alternating changing polarity and having a fixed initial polarity;

receiving means for receiving the reflected energy and producing a signal corresponding thereto;

means coupled to said receiving means for providing an output signal in response to the polarity of said corresponding signal with respect to the polarity of the initial half cycle of the transmitted ultrasonic energy, said output means including means for dividing said signal into two trains of pulses of different polarities, with pulses in each of said trains corresponding to the polarities and times of said received signal; and means coupled to said output means for indicating which of the two trains of pulses of different polarities occur first with relation to the predetermined fixed initial polarity being responsive when pulses of said second polarity occur first.

12. A tester as defined in claim 11 wherein said indicating means includes gating means having a first state for passing the pulses of a first polarity and a second state for inhibiting the pulses of a first polarity, said gating means being responsive to the pulses of a second polarity in the second train to change from one of the states to the other state when the pulses in the first train occur before the corresponding pulses in the second train.

13. The combination as defined in claim 12 wherein said means for indicating which of the two trains of pulses of different polarities occur first includes means coupled to said gating means for providing a signal responsive to the signals passed thereby.